United States Patent [19]
Snitzer

[11] Patent Number: 5,877,890
[45] Date of Patent: Mar. 2, 1999

[54] OPTICAL-FIBER AMPLIFIER HAVING HIGH-SATURATION OUTPUT

[75] Inventor: Elias Snitzer, Piscataway, N.J.

[73] Assignee: Rutgers, The State University of New Jersey, New Brunswick, N.J.

[21] Appl. No.: 739,537

[22] Filed: Oct. 30, 1996

[51] Int. Cl.⁶ .................................. H01S 3/00; H01S 3/11
[52] U.S. Cl. .................................. 359/341; 372/6; 372/10
[58] Field of Search .................................. 372/6, 10, 11; 359/341

[56] References Cited

U.S. PATENT DOCUMENTS

| | | | |
|---|---|---|---|
| 3,636,473 | 1/1972 | Young | 331/94.5 |
| 5,058,976 | 10/1991 | DiGiovanni et al. | 354/173 |
| 5,155,621 | 10/1992 | Takeda et al. | 359/337 |
| 5,291,501 | 3/1994 | Hanna | 372/6 |
| 5,373,576 | 12/1994 | Minns et al. | 385/125 |
| 5,467,218 | 11/1995 | Takeda et al. | 359/341 |
| 5,469,292 | 11/1995 | Bjarklev et al. | 359/341 |
| 5,485,480 | 1/1996 | Kleinerman | 372/6 |
| 5,491,581 | 2/1996 | Roba | 359/341 |

*Primary Examiner*—Mark Hellner
*Attorney, Agent, or Firm*—Salzman & Levy

[57] ABSTRACT

The present invention features a light-pumped, single-mode, pulse- or continuous-wave amplifier, or a Q-switch, with each having a high-saturation output power. The amplifier or Q-switch has a light-pumped, optical fiber having active ions that are either annularly located within the cladding or adjacent the core/cladding interface. Pump-light and an input signal are coupled to the fiber via a dispersive or biconically-tapered coupler. The light-pumped fiber provides stored energy, with an induced emission in the excited-state population that is relatively low for the given amount of energy stored. The central part of the core both stores and propagates whatever light is present, due to induced emission, which takes place only in the annular region. The light that is incident on the fiber is of sufficient intensity so that, despite the low rate of induced emission per unit of light intensity, a significant power increase occurs.

24 Claims, 4 Drawing Sheets

OPTICAL-FIBER AMPLIFIER HAVING HIGH-SATURATION OUTPUT

FIELD OF THE INVENTION

The present invention pertains to optical-fiber devices and, more particularly, to an optical-fiber device with active ions disposed either in the cladding or at a core/cladding interface. Light pumped through the core of the optical fiber is insensitive to amplified, spontaneous emission depletion, thus making possible the use of the optical fiber as a pulsing- or continuous-wave amplifier (or Q-switch), with each having a high-saturation output power.

BACKGROUND OF THE INVENTION

Doping in amplifying devices has traditionally been centered within the fiber core, in order to achieve a good signal. It has recently been suggested that optical waveguide amplifiers and lasers be fabricated with the dopant placed in an annular distribution about the core, i.e., with the dopant distributed between the center and the core/cladding interface. An optical amplifier with this type of dopant distribution is shown in U.S. Pat. No. 5,259,046 (issued to DI GIOVANNI et al on Nov. 2, 1993), entitled "Article Comprising an Optical Waveguide Containing a Fluorescent Dopant". The object of this patented apparatus was to provide an optical amplifier that was relatively insensitive to variations in cut-off wavelength, as well as pump-power modal distribution. This insensitivity provided a means of fabricating optical fiber having reduced tolerances.

The aforementioned patent, however, discloses a problem with this annular, doping technique, in that the amplifier gain drops with a decrease in the wavelength. Thus, amplifiers which employ an annular, doping configuration have a higher threshold power, but it is at the expense of lower gain. However, amplifiers having a low gain are generally ineffective.

The above, annular, doping configuration can also be used for a different purpose, one in which the lower gain limitation becomes irrelevant. The current invention advances the idea that doping the cladding of an optical fiber can provide an optical device which can be used as a final stage, either a pulse- or continuous-wave amplifier, or a Q-switch, with each having a high-value saturation output.

In the past, amplifiers configured to provide high-output power had an inability to store energy as an inverted population, because the amplified, spontaneous emission in the doped core depleted the inversion. The present invention, however, reflects the discovery that an annular, doping technique makes possible an optical fiber having a pumped energy that will be insensitive to depletion inversion. In such a situation, a low gain is not important. What is important is that one can construct a high-output power amplifier, or a Q-switch.

This invention suggests a single-mode fiber design with active, rare-earth ions (such as neodymium [Nd], erbium [Er], thulium [Tm], praseodymium [Pr] and ytterbium [Yb]) located in an annular region within or next to the cladding, i.e., straddling the core/cladding interface. The core is substantially free of any gain material, and the index of refraction is essentially the same for both core and cladding. The transition probability of induced emission is proportional to the square of the transverse component of the field. Therefore, the active ions in the annular region have a diminished tendency for induced emission, resulting in the ability of the inventive fiber configuration to store more inverted ions without being depleted by amplified, spontaneous emission.

In one embodiment of this invention, the fiber has indices of refraction between the core and the active ion interface that are essentially the same. A transverse component of the electrical-field strength in the core of a single-mode, step-index fiber is defined by a Zero$^{th}$ order Bessel function $J_o$. The field strength in the cladding is defined by a modified Hankel function $K_o$. The fiber is designed with a "V" value for the modified Hankel function, which is less than 2.405, a value consistent with single-mode operation, as defined by $J_o$. The radius of the core "a" will be less than 15 microns, and the optical fiber can operate with a wavelength of 1.5 microns.

Such a light-pumped fiber device provides an amplifier in which the induced emission per given amount of energy that is stored in the excited state population is relatively low. The central part of the core both stores and propagates whatever light is present, due to induced emission, which takes place only in the annular region. The light that is incident on the fiber is of sufficient intensity, so that, despite the low rate of induced emission per unit of light intensity, there is a significant power increase.

DISCUSSION OF RELATED ART

In U.S. Pat. No. 5,467,218 (issued to TAKEDA et al on Nov. 14, 1995), entitled "Optical Fiber Amplifier", an erbium-aluminum-doped center and an erbium-doped, annular section is shown for a fiber amplifier. The object of this particular fiber configuration is to achieve a relatively flat gain over a range of light-signal wavelengths.

In U.S. Pat. No. 5,469,292 (issued to BJARKLEV et al on Nov. 21, 1995), entitled "Method of Amplifying an Optical Signal, An Optical Amplifier for Performing the Method, and Use of Such an Optical Amplifier as a Light Source", an active, optical waveguide is illustrated, which features annular rings that are disposed away from the core center, and contains doped, transition metals. The purpose of the waveguide device is to reduce amplified, spontaneous emissions at a relatively short wavelength. The device is generally applicable for level-4, optical amplifiers.

In U.S. Pat. No. 5,491,581 (issued to ROBA on Feb. 13, 1996), entitled "Rare Earth Doped Optical Fibre Amplifiers", an amplifier is illustrated that comprises an erbium-doped core that is surrounded by a cladding having a coefficient of expansion that is compatible with the core.

In U.S. Pat. No. 3,636,473 (issued to YOUNG on Jan. 18, 1972), entitled "Composite Glass Laser Rod", an outer, doped annulus is illustrated that amplifies spontaneous emission. This device is used as a columnator oscillator, not as an amplifier.

SUMMARY OF THE INVENTION

In accordance with the present invention, there is provided a light-pumped, single-mode, pulse- or continuous-wave amplifier, or a Q-switch, with each having a high-saturation output power. The amplifier, or Q-switch, comprises a light-pumped, optical fiber halving active ions that are annularly disposed within the cladding, or are adjacent the core/cladding interface. Pumped light and an input signal are coupled to the fiber via a dispersive or biconically-tapered coupler. The light-pumped fiber provides stored energy, which has an induced emission in the excited state population that is relatively low for the given amount of energy stored. The central part of the core both stores and propagates whatever light is present, due to induced emission, which takes place only in the annular region. The light that is incident on the fiber is of sufficient intensity, so that, despite the low rate of induced emission per unit of light intensity, a significant power increase occurs.

It is an object of this invention to provide an improved, optical, pulse amplifier, or a Q-switch.

It is another object of the invention to provide a single-mode, optical-fiber, amplification device having high-saturation output power.

It is a further object of this invention to provide an optical amplifier or a Q-switch that is operative in a single mode, having an optical fiber that has its active ions annularly disposed either in the cladding or adjacent the core/cladding interface, and with a pumped- light energy that is stored as an inverted population.

BRIEF DESCRIPTION OF THE DRAWINGS

A complete understanding of the present invention may be obtained by reference to the accompanying drawings, when considered in conjunction with the subsequent, detailed description, in which.

DESCRIPTION OF THE PREFERRED EMBODIMENT

Generally speaking, the invention features a light-pumped, optical fiber that has its active ions disposed within the cladding. The light-pumped fiber provides stored energy, having an induced emission in the excited state population that is relatively low for the given amount of energy stored. The central part of the core both stores and propagates whatever light is present, due to induced emission, which takes place only in the annular region. The light that is incident on the fiber is of sufficient intensity so that, despite the low rate of induced emission per unit of light intensity, a significant power increase occurs.

Figure 1:
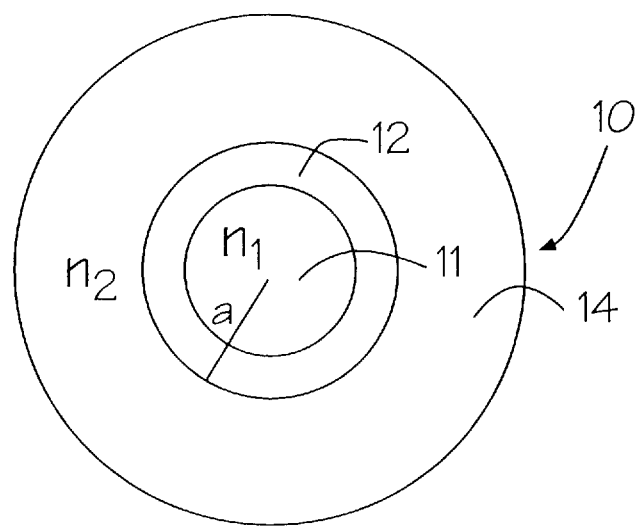
FIG. 1 illustrates a plan, enlarged view of an optical fiber that is fabricated in accordance with the invention.

Now referring to FIG. 1, an optical fiber 10 is shown having a core 11, a cladding 14 and an interface region 12 that straddles the core 11 and the cladding 14. The optical fiber is fabricated so that its active ions are in an annular region 12 adjacent the core/cladding interface. The active ions can be selected from rare-earth materials, such as neodymium [Nd], erbium [Er], thulium [Tm], praseodymium [Pr] and ytterbium [Yb]. The optical fiber 10 can be fabricated by utilizing MCVD, sol-gel or solution-doping methods. The optical-fiber material can be chosen from materials that are well known to the practitioner, and consistent with the objectives stated herein.

When sufficiently light-pumped, the optical fiber 10 of this invention can be used as a final-stage, pulsing- or continuous-wave amplifier, or a Q-switch, each of which generates a high-saturation output power.

Traditionally, the limitation in utilizing high-saturation amplification, has been its inability to store energy as inverted population, because of the amplified, spontaneous emission that depletes the inversion. However, because the active ions are located where the field distribution has a low light intensity, the inversion is not depleted in this optical-fiber design.

Figure 2:
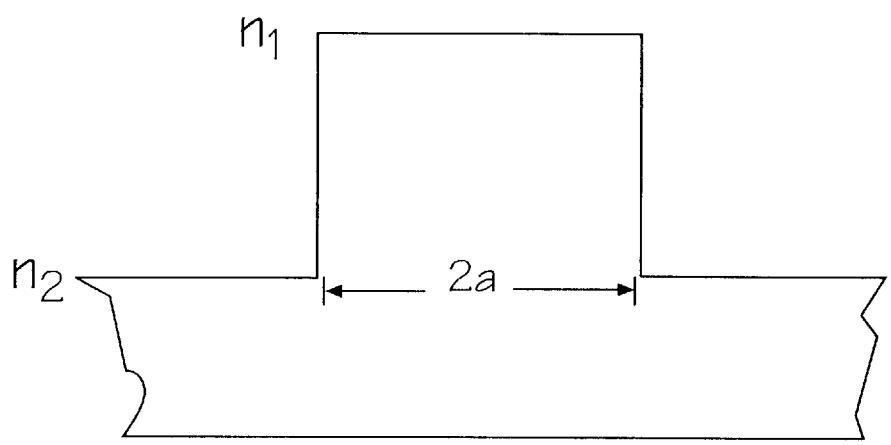
FIG. 2 depicts a graphical view of the indices of refraction for the optical fiber shown in FIG. 1.

Referring to FIG. 2, a graph of the indices of refraction $n_1$ and $n_2$ for the respective core 11 and cladding 14 is shown for the optical fiber 10 depicted in FIG. 1. The annular region 12 has essentially the same index of refraction as that of the core 11, which contains none of the active ion material. The graph illustrates a clean step-index between the core 11 and the cladding 14. However, it is possible to fabricate the optical fiber so that there is either a dip in the central index of refraction, or a gradual tapering of the index from the core 11 towards the cladding region 14. For the single-mode, step-index fiber as shown, a transverse component of the electrical-field strength in the core 11 is defined by a Zero$^{th}$ order Bessel function $J_o(ur/a)$, where "r" is the distance from the center to a point in the core 11, and "a" is the radius of core 11. The parameter "u" gives the scale of the Bessel function. The field strength in the cladding 14 is defined by a modified Hankel function $K_o(wr/a)$, where "w" is the scale of the Hankel function. The values for "u" and "w" are related to the "V" value by the following equation:

$$V^2 = u^2 + w^2$$

where $V=(2\pi a/\lambda n)(n_1^2-n_2^2)^{1/2}$, and the indices of refraction for the core 11 and the cladding 14 are respectively given by $n_1$ and $n_2$.

Figure 3:
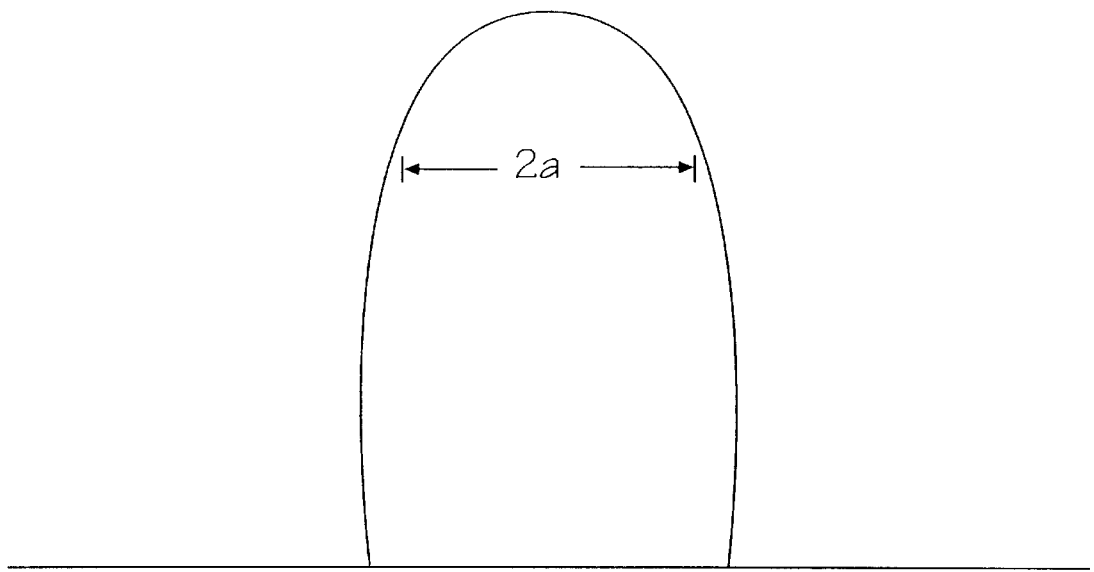
FIG. 3 illustrates a graphic view c)f the transverse component (expressed as a Bessel function) of the electrical field for the optical fiber depicted in FIG. 1.

Referring to FIG. 3, the transverse component of the electrical field is represented in graphical view. The field strength is very low in the annular region 12. The transverse component of the field, as defined by the Bessel function, would be even lower if the dopant were placed within the cladding 14. Active ions in the annular region 12 experience less of a tendency to have an induced emission, owing to the fact that the transition probability for induced emission is proportional to the square of the transverse component of the field. Therefore, having this configuration, the optical fiber 10 is able to store more inverted ions without being depleted by amplified, spontaneous emission.

Figure 4:
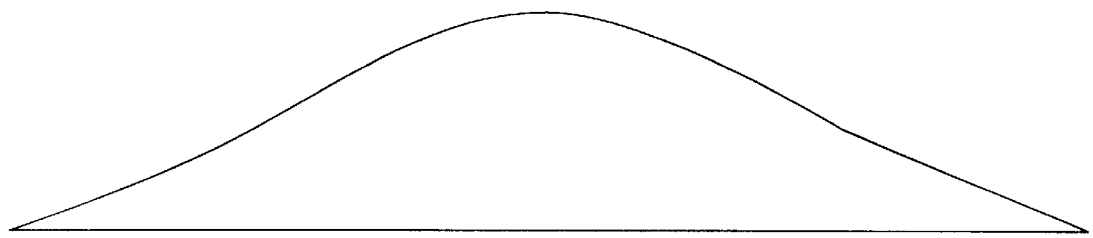
FIG. 4 shows a graphic view of the transverse component (expressed as a modified Hankel function) of the electrical field for the optical fiber depicted in FIG. 1.

The fiber is designed with a "V" value for the modified Hankel function, which is less than 2.405, a value consistent with single-mode operation, as defined by $J_o$, and as illustrated in FIG. 4. The radius of the core "a" is less than 15 microns, and the fiber will operate with a wavelength of 1.5 microns.

The optical fiber 10 operates by having a relatively low, induced emission for the amount of energy stored in excited state population. The field strength still follows, at least approximately, the distribution shown in FIGS. 3 and 4. The central part of the core 11 serves to store and to propagate whatever light is present, due to induced emission that only occurs in the annular region 12.

Figure 5:
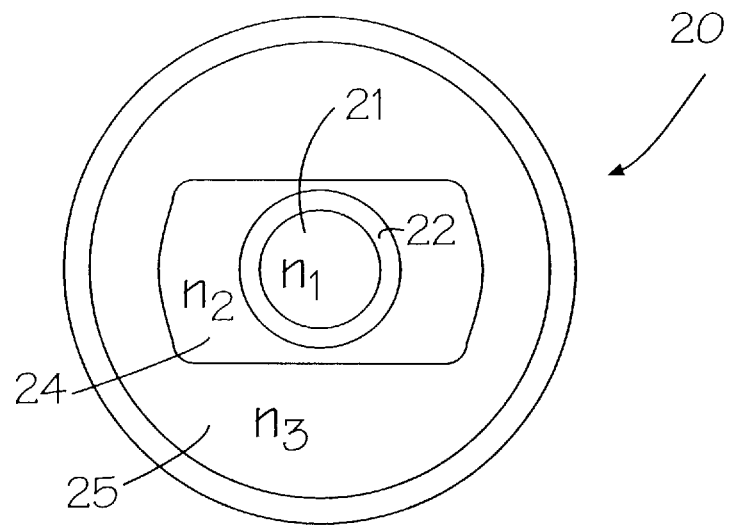
FIG. 5 depicts a plan, enlarged view of an alternate embodiment of the optical fiber shown in FIG. 1, an embodiment featuring a double-clad configuration.
Figure 7:
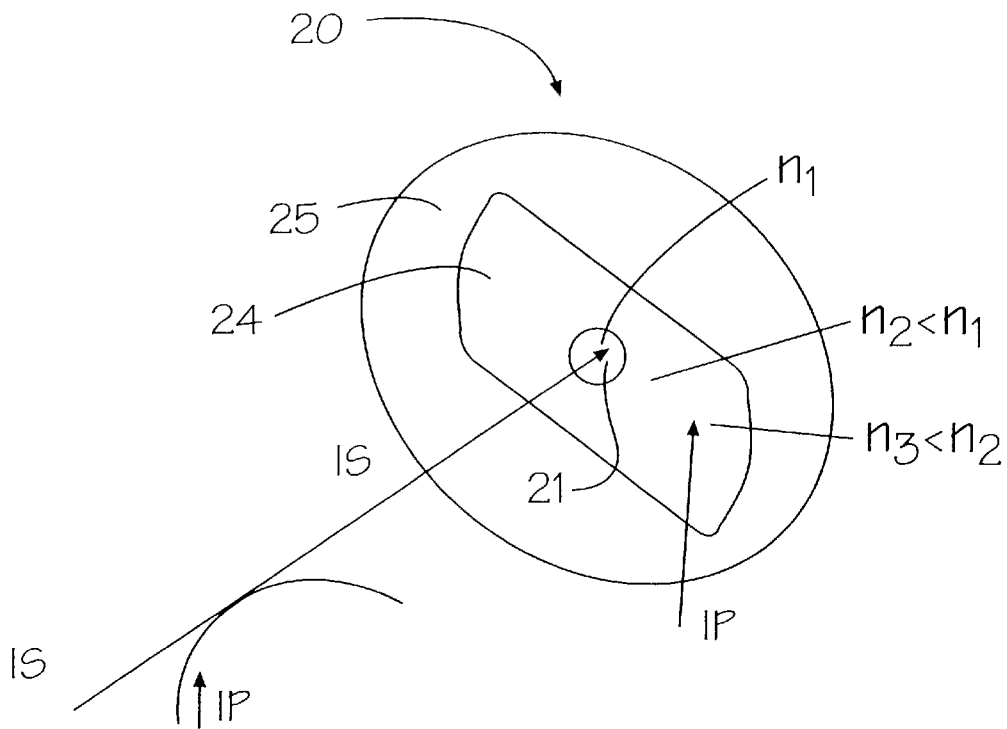
FIG. 7 shows a perspective, schematic view of the optical fiber of FIG. 5, as it is being light-pumped and fed a light signal.

Referring to FIG. 5, an alternate embodiment of an optical fiber 20 is shown. The optical fiber 20 has a core 21 and an interface region 22 that are similar to the core 11 and annular region 12 depicted in FIG. 1. The optical fiber 20 has two claddings 24 and 25, respectively. The pump light $I_p$, which is coupled into the first cladding 24 (as shown in FIG. 7), is absorbed by the annular interface region 22, as it propagates down the length of the optical fiber 20. The configuration shown in FIG. 5 represents an optical-fiber design for the last stage of amplification for a high-output power amplifier. This configuration is also suitable for a Q-switch, in which it is desirable to store a relatively large amount of energy, prior to switching the cavity Q to a high value, in order to extract the stored energy in a single pulse. The light that is incident upon the optical fiber 20 is of sufficient light intensity, so as to provide a significant increase in power, despite the relatively low rate of induced emission per unit of light intensity.

Figure 6:
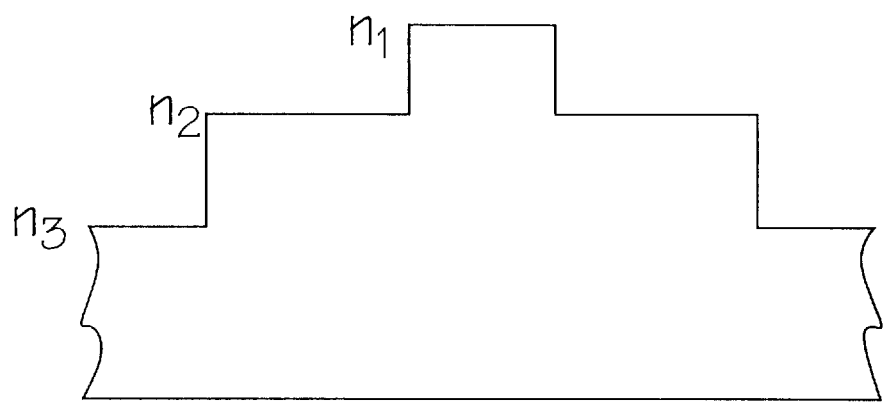
FIG. 6 illustrates a graphical view of the indices of refraction for the optical fiber depicted in FIG. 5.

Referring to FIG. 6, a graph of the indices of refraction $n_1$, $n_2$ and $n_3$ for the respective core 21 and first and second claddings 24 and 25 is shown for the optical fiber 20, depicted in FIG. 5. The annular region 22 has essentially the same index of refraction as that of the core 21, which contains none of the active ion material. The graph illustrates clean stepped-indices between the core 21 and the claddings 24 and 25, respectively.

Referring to FIG. 7, a perspective view of the optical fiber 20 is shown, with an introduction of the light signal and pumping-lights $I_s$ and $I_p$, respectively. Both the light signal and the pumping-light can be coupled to the optical fiber 20 by a dispersive coupler or a biconically-tapered coupler (not shown).

Figure 8:
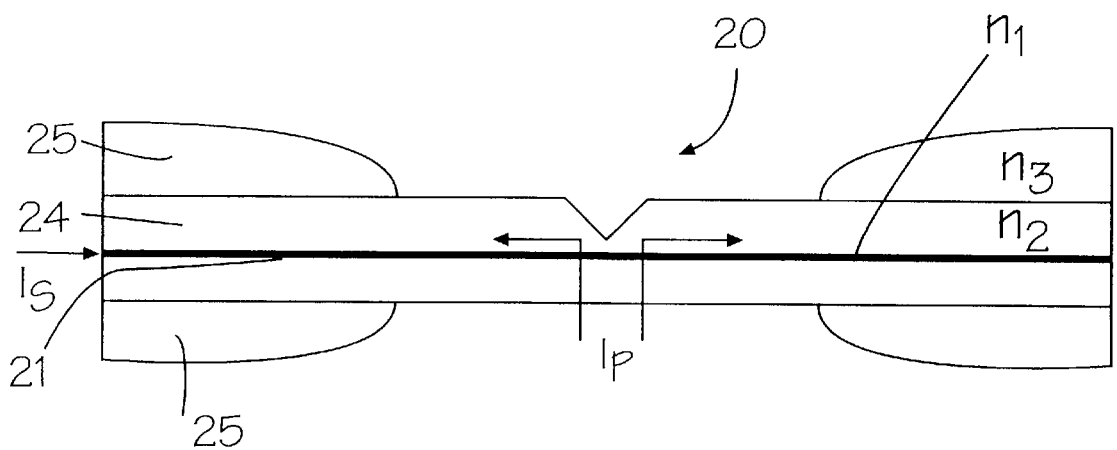
FIG. 8 depicts a sectional view of an alternate, light-pumping embodiment for the optical fiber shown in FIG. 7.

Referring to FIG. 8, a side view of the optical fiber 20 is depicted with an alternate, light-pumping embodiment.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A light-pumped, single-mode Q-switch, having a high-saturation output power, said light-pumped, single-mode Q-switch comprising a light-pumped, optical fiber having a core and at least one cladding, a core/cladding interface region containing active ions and energy supply means coupled to said light-pumped, optical fiber for supplying said light-pumped, single-mode Q-switch with pump-light and an input signal, said light-pumped fiber providing stored energy, with an induced emission in an excited-state population that is relatively low for a given amount of energy stored, and with a central part of said core both storing and propagating whatever light is present, due to induced emission, which occurs only in said core/cladding interface region, and whereby there is a significant power increase, despite a low rate of induced emission per unit of light intensity.

2. The light-pumped, single-mode Q-switch in accordance with claim 1, wherein said energy supply means coupled to said light-pumped, optical-fiber light comprises a dispersive coupler.

3. The light-pumped, single-mode Q-switch in accordance with claim 1, wherein said energy supply means coupled to said light-pumped, optical-fiber light comprises a biconically-tapered coupler.

4. The light-pumped, single-mode Q-switch in accordance with claim 1, wherein said core/cladding interface region containing active ions comprises ions selected from a group consisting of neodymium, erbium, thulium, praseodymium and ytterbium.

5. The light-pumped, single-mode Q switch in accordance with claim 1, wherein said at least one cladding comprises a single-cladding configuration.

6. The light-pumped, single-mode Q-switch in accordance with claim 1, wherein said at least one cladding comprises a double-cladding configuration.

7. The light-pumped, single-mode Q-switch in accordance with claim 1, wherein said core/cladding interface region containing active ions has an index of refraction that is substantially equal to an index of refraction of said core.

8. A light-pumped, single-mode Q-switch having a high-saturation output power, said light-pumped, single-mode Q-switch comprising a light-pumped, optical fiber having a core and a first cladding, said first cladding containing active ions, and energy supply means coupled to said light-pumped, optical fiber for supplying said light-pumped, single-mode Q-switch with a pump-light and an input signal, said light-pumped fiber providing stored energy, with an induced emission in an excited-state population that is relatively low for a given amount of energy stored, and with a central part of said core both storing and propagating whatever light is present, due to induced emission, which occurs only in said first cladding, and whereby there is a significant power increase, despite a low rate of induced emission per unit of light intensity.

9. The light-pumped, single-mode Q-switch in accordance with claim 8, wherein said energy supply means coupled to said light-pumped, optical-fiber light comprises a dispersive coupler.

10. The light-pumped, single-mode Q-switch in accordance with claim 8, wherein said energy supply means coupled to said light-pumped, optical-fiber light comprises a biconically-tapered coupler.

11. The light-pumped, single-mode Q-switch in accordance with claim 8, wherein said first cladding containing active ions comprises ions selected from a group consisting of neodymium, erbium, thulium, praseodymium and ytterbium.

12. The light-pumped, single-mode Q-switch in accordance with claim 8, further comprising a second cladding adjacent said first cladding.

13. A light-pumped, single-mode amplifier having a high-saturation output power, said light-pumped, single-mode amplifier comprising a light-pumped, optical fiber having a core and at least one cladding, a core/cladding interface region containing active ions, and energy supply means coupled to said light-pumped, optical fiber for supplying said light-pumped, single-mode amplifier with pump-light and an input signal, said light-pumped fiber providing stored energy, with an induced emission in an excited-state population that is relatively low for a given amount of energy stored, and with a central part of said core both storing and propagating whatever light is present, due to induced emission, which occurs only in said core/cladding interface region, and whereby there is a significant power increase, despite a low rate of induced emission per unit of light intensity.

14. The light-pumped, single-mode amplifier in accordance with claim 13, wherein said energy supply means coupled to said light-pumped, optical-fiber light comprises a dispersive coupler.

15. The light-pumped, single-mode amplifier in accordance with claim 13, wherein said energy supply means coupled to said light-pumped, optical-fiber light comprises a biconically-tapered coupler.

16. The light-pumped, single-mode amplifier in accordance with claim 13, wherein said core/cladding interface region containing active ions comprises ions selected from a group consisting of neodymium, erbium, thulium, praseodymium and ytterbium.

17. The light-pumped, single-mode amplifier in accordance with claim 13, wherein said at least one cladding comprises a single-cladding configuration.

18. The light-pumped, single-mode amplifier in accordance with claim 13, wherein said at least one cladding comprises a double-cladding configuration, and wherein said amplifier comprises a final-stage, amplifying device.

19. The light-pumped, single-mode amplifier in accordance with claim 13, wherein said core/cladding interface region containing active ions has an index of refraction that is substantially equal to an index of refraction of said core.

20. A light-pumped, single-mode amplifier having a high-saturation output power, said light-pumped, single-mode amplifier comprising a light-pumped, optical fiber having a core and a first cladding, said first cladding containing active ions, and energy supply means coupled to said light-pumped, optical fiber for supplying said light-pumped, single-mode amplifier with pump-light and an input signal, said light-pumped fiber providing stored energy, with an induced emission in an excited-state population that is relatively low for a given amount of energy stored, and with a central part of said core both storing and propagating whatever light is present, due to induced emission, which occurs only in said first cladding, and whereby there is a significant power increase, despite a low rate of induced emission per unit of light intensity.

21. The light-pumped, single-mode amplifier in accordance with claim 20, wherein said energy supply means coupled to said light-pumped, optical-fiber light comprises a dispersive coupler.

22. The light-pumped, single-mode amplifier in accordance with claim 20, wherein said energy supply means coupled to said light-pumped, optical-fiber light comprises a biconically-tapered coupler.

23. The light-pumped, single-mode amplifier in accordance with claim 20, wherein said first cladding containing active ions comprises ions selected from a group consisting of neodymium, erbium, thulium, praseodymium and ytterbium.

24. The light-pumped, single-mode amplifier in accordance with claim 20, further comprising a second cladding adjacent said first cladding, and wherein said amplifier comprises a final-stage, amplifying device.

* * * * *